United States Patent [19]

Ichikawa et al.

[11] Patent Number: 5,440,008

[45] Date of Patent: Aug. 8, 1995

[54] PROCESS FOR PREPARING POLYHYDROXYCARBOXYLIC ACID

[75] Inventors: Fumiaki Ichikawa; Mineo Kobayashi; Masahiro Ohta; Yasunori Yoshida; Shoji Obuchi; Hiroyuki Itoh, all of Fukuoka, Japan

[73] Assignee: Mitsui Toatsu Chemicals, Inc., Tokyo, Japan

[21] Appl. No.: 246,289

[22] Filed: May 19, 1994

[30] Foreign Application Priority Data

May 28, 1993 [JP] Japan ................................ 5-126828
Dec. 24, 1993 [JP] Japan ................................ 5-326839

[51] Int. Cl.⁶ .......................................... C08G 63/06
[52] U.S. Cl. ................................. 528/361; 528/354; 528/357
[58] Field of Search ...................... 528/354, 357, 361

[56] References Cited

U.S. PATENT DOCUMENTS 5,310,865  5/1994  Enomoto et al. .................. 528/361

Primary Examiner—Melvyn I. Marquis
Assistant Examiner—Shelley A. Dodson
Attorney, Agent, or Firm—Burns, Doane, Swecker & Mathis

[57] ABSTRACT

A process for preparing polyhydroxycarboxylic acid by conducting dehydration polycondensation of hydroxycarboxylic acids in the presence or absence of a catalyst and in the presence or absence of an organic solvent, comprising using a vertical high viscosity reactor during all or a portion of the dehydration polycondensation steps and conducting hot polycondensation while separating and removing low boiling components. The process can provide high molecular weight polyhydroxycarboxylic acid with ease and cheaply in industry.

18 Claims, 3 Drawing Sheets

PROCESS FOR PREPARING POLYHYDROXYCARBOXYLIC ACID

BACKGROUND OF THE INVENTION AND RELATED ART

1. Field of the Invention

The present invention relates to a process for preparing polyhydroxycarboxylic acid which is valuable as a biodegradable polymer used for a medical material and a substitute for general purpose resins.

2. Related Art of the Invention

Polyhydroxycarboxylic acid has biodegradability in addition to excellent mechanical, physical and chemical properties and can be degraded under conditions encountered in the natural environment without adverse impact thereon and is finally decomposed to carbon dioxide and water by microorganisms. Consequently, the polymer has recently received attention in various fields of use such as a medical material and a substitute for general purpose resins in view of environmental protection, and is expected to greatly extend its future demand.

As a preparation process of polyhydroxycarboxylic acid, it has been known in the case of, for example, lactic acid and glycolic acid that the raw material acid is usually dimerized by dehydration to first give a cyclic dimer. Ring opening melt-polymerization of the cyclic dimer is then carried out in the presence of a catalyst to prepare a high molecular weight polymer. The process, however, is unfavorable in economy because great labor and expenses are required for the preparation of the cyclic dimer, lactide and glycolide. Further, some kinds of hydroxycarboxylic acid do not form a cyclic dimer and the process cannot be applied to such cases.

On the other hand, processes for preparing polyhydroxycarboxylic acid by direct dehydration of hydroxycarboxylic acid or its oligomer have been disclosed in Japanese Laid Open Patent SHO 59-096123 and 61-028521.

In these processes, however, the inherent viscosity of the resulting polymer is limited about 0.3 dl/g and thus the polymer is insufficient in mechanical strength and cannot be applied to some uses.

Further, the present inventors have applied for a patent (Japanese Patent Application HEI 4-337321) on a process for preparing polyhydroxycarboxylic acid having an average molecular weight of 30,000 or more by azeotropically dehydrating hydroxycarboxylic acid or its oligomer in an organic solvent in the presence of a catalyst in an inert atmosphere, treating the distilled solvent with a drying agent, and returning the treated solvent to the reaction system. The process, however, requires a reaction time of 17~50 hours in order to obtain polyhydroxycarboxylic acid having an average molecular weight of 120,000 and thus efficiency is not so good.

When a kettle type reactor equipped with a common stirring blade is used, the reaction is carried out under reduced pressure or under ventilation of an inert gas in order to remove low boiling components, i.e., water in the case of polyhydroxycarboxylic acid formation, which leads to a reduction in reaction rate. However, in the case of the kettle type reactor equipped with the common stirring blade, it is difficult to remove efficiently the low boiling components because of low efficiency of contact between the inert gas and the reaction mass and further because of the depth of the reaction mass even though pressure reduction is enhanced.

SUMMARY OF THE INVENTION

As a result of an intensive investigation on a direct dehydration polycondensation which can prepare polyhydroxycarboxylic acid efficiently, easily and cheaply in industry, the present inventors have found that a higher molecular weight polyhydroxycarboxylic acid can be prepared in a short reaction time by use of a vertical reactor for a high viscosity reaction mass.

That is, one aspect of the invention is a process for preparing polyhydroxycarboxylic acid by conducting dehydration polycondensation of a hydroxycarboxylic acid in the presence or absence of a catalyst and in the presence or absence of an organic solvent, comprising using a vertical high viscosity reactor during all or a portion of the dehydration polycondensation steps and conducting hot polycondensation while separating and removing low boiling components.

DESCRIPTION OF SYMBOLS

Figure 1:
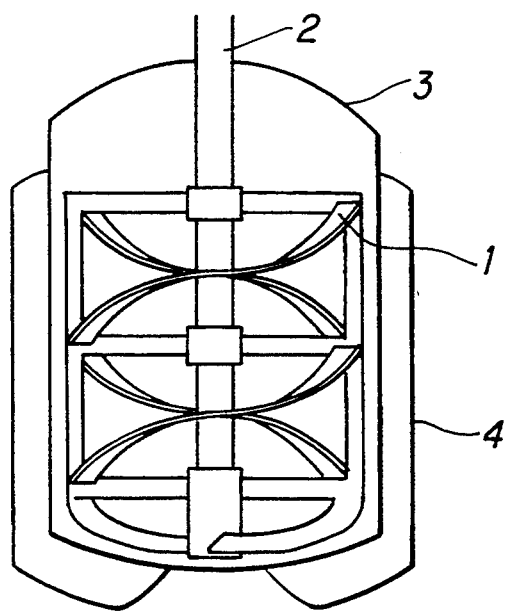
FIG. 1 is a schematic drawing of a vertical high viscosity reactor of the invention which is equipped with a ribbon type stirring blade supported with a shaft.

1. Ribbon type stirring blade
2. Rotation axis
3. Vertical high viscosity reactor
4. Jacket
5. Frame
6. Glass lined reactor
7. Three sweepback blades

DETAILED DESCRIPTION OF PREFERRED EMBODIMENTS

The vertical high viscosity reactor used in the invention has various shapes of stirring blades in the interior. These blades slice components of the raw material into the form of a thin film with rotation of the axis and the surface renewal thus conducted accelerates evaporation of the low boiling components and promotes the polymerization reaction.

The stirring blades which can be used in the invention include, for example, torsion lattice blades without a shaft which reduce material retention around the shaft; a combination of Maximum blend blades and ribbon blades which can cope with a rapid change in viscosity in the course of operation and which can reduce adhesion of the material to the inner wall of the reactor; spiral blades which have enhanced mixing ability, large contact surface between gas and liquid, and excellent surface renewal function; and transfer blades which can move up and down with rotation.

No particular restriction is imposed upon the vertical high viscosity reactor for use in the invention. Preferred high viscosity reactors have strong power for stirring, broad heat transfer surface and excellent surface renewal function.

High viscosity reactors which can be used include, for example,

① vertical reactors which have ribbon type stirring blades in the interior;

② vertical reactors which have ribbon type stirring blades in the interior and support the ribbon type blades with a frame in place of a shaft;

③ vertical cone reactors equipped, in the interior, with ribbon type stirring blades which have a cone angle almost equal to that of the inner wall of the reactors; and ④ vertical cone reactors equipped, in the interior, with ribbon type stirring blades which have a cone angle almost equal to that of the inner wall of the reactors and are supported with a frame in place of a shaft.

Practical examples of these vertical high viscosity reactors include ADVANCED RIBBON REACTOR (AR) and VERTICAL CONE REACTOR (VCR) (manufactured by Mitsubishi Heavy Industry Co.), LOGBORN (manufactured by Shinko Pantec Co.), TORSION LATTICE BLADE (manufactured by Hitachi Co.), SUPPER BLEND (concentric twin axes type stirring both manufactured by Sumitomo Heavy Industry Co.) and VISTOR (high viscosity stirrer manufactured by Nissen Co.). In the process of the invention, the vertical high viscosity reactor can be used during all or a portion of the steps of dehydration polycondensation.

In order to exhibit the effect of the vertical high viscosity reactor on enhancement of the surface renewal function in the reaction of a solution having from medium to high viscosity, the high viscosity reactor is preferably used after increasing the molecular weight of polyhydroxycarboxylic acid to a certain extent.

Exemplary hydroxycarboxylic acids which can be used in the invention include glycolic acid, lactic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanoic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-ethyloctanoic acid, 2-hydroxy-2-propyloctanoic acid, 2-hydroxy-2-butyloctanoic acid, 2-hydroxy-2-pentyloctanoic acid, 2-hydroxy-2-hexyloctanoic acid, 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxy-3-methylbutanoic acid, 3-hydroxy-3-methylpentanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-ethylheptanoic acid, 3-hydroxy-3-propylheptanoic acid, 3-hydroxy-3-butylheptanoic acid, 3-hydroxy-3-methyloctanoic acid, 3-hydroxy-3-ethyloctanoic acid, 3-hydroxy-3-propyloctanoic acid, 3-hydroxy-3-butyloctanoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid, 4-hydroxy-4-methylpentanoic acid, 4-hydroxy-4-methylhexanoic acid, 4-hydroxy-4-ethylhexanoic acid, 4-hydroxy-4-methylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyl-octanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, 8-hydroxyoctanoic acid and a mixture of these hydroxycarboxylic acids.

Oligomers derived from the above hydroxycarboxylic acids can also be used as raw materials in the present invention. The oligomer can be used singly or as a mixture of the above oligomers.

Some of these hydroxycarboxylic acids have optically active isomers and are divided into D-, L- and D/L-isomers. However, no particular restriction is imposed in the invention upon the structure of these isomers.

In the process of the present invention, a catalyst is optionally used according to a polymerization degree (an inherent viscosity, molecular weight). In the case of production of a low molecular weight polymer (inherent viscosity less than 0.3), the desired polymer can be prepared in the presence or absence of a catalyst. On the other hand, in the case of production of a high molecular weight (inherent viscosity of 0.3 or more), a catalyst is preferably used with due regard to the reaction time (the reaction rate).

The catalysts used in the invention include the group I, II, III, IV, and V metals, or salts, hydroxides and oxides of these metals.

Exemplary catalysts which can be used include zinc, tin, aluminum, magnesium and other metals; tin oxide, antimony oxide, zinc oxide, aluminum oxide, magnesium oxide, titanium oxide and other metal oxides; zinc chloride, stannous chloride, stannic chloride, stannous bromide, stannic bromide, antimony fluoride, magnesium chloride, aluminum chloride and other metal halogenides; sodium hydroxide, potassium hydroxide, calcium hydroxide, magnesium hydroxide, aluminum hydroxide, zinc hydroxide iron hydroxide, cobalt hydroxide, nickel hydroxide, copper hydroxide, cesium hydroxide, strontium hydroxide, barium hydroxide, lithium hydroxide, zirconium hydroxide and other metal hydroxides; tin sulfate, zinc sulfate, aluminum sulfate, and other metal sulfates, magnesium carbonate, zinc carbonate, calcium carbonate and other metal carbonates; tin acetate, tin octoate, tin lactate, zinc acetate, aluminum acetate, iron lactate and other metal organic carboxylates; and tin trifluoromethanesulfonate, tin p-toluenesulfonate and other metal organic sulfonates.

Other exemplary catalysts include, for example, dibutyltin oxide and other organic metal oxides of above metals, titanium isopropoxide and other metal alkoxides of above metals, diethylzinc and other alkyl metals of the above metals, and DOWEX TM and AMBERLITE TM and other ion exchange resins. The amount of these catalysts is preferably 0.0001~10% by weight for the weight of the above hydroxycarboxylic acids.

In the process of the present invention, the step of dehydration polycondensation can be carried out in the presence or absence of a solvent.

In the case of using an organic solvent, the organic solvent used includes, for example, aromatic hydrocarbons and aromatic ethers.

Exemplary aromatic hydrocarbons include toluene, xylene, naphthalene, biphenyl, chlorobenzene, o-chlorotoluene, m-chlorotoluene, p-chlorotoluene and other aromatic hydrocarbons. Exemplary aromatic ethers include alkoxybenzenes and diphenylethers. Exemplary alkoxybenzenes include anisole, ethoxybenzene, propoxybenzene, butoxybenzene, pentoxybenzene, 2,4-dimethoxybenzene, 2-chloromethoxybenzene, 2-bromomethoxybenzene, 4-chloromethoxybenzene, 4-bromomethoxybenzene, 2,4-dichloromethoxybenzene and other alkoxybenzenes. Exemplary diphenylethers include diphenyl ether, 4,4'-dimethyldiphenyl ether, 3,3'-dimethyldiphenyl ether, 3-methyldiphenyl ether and other alkyl substituted diphenyl ethers; 4,4'-dibromodiphenyl ether, 4,4'-dichlorodiphenyl ether, 4-bromodiphenyl ether, 4-methyl-4-bromodiphenyl ether and other halogen substituted diphenyl ethers; 4-methoxydiphenyl ether, 4,4'-dimethoxydiphenyl ether, 3,3'-dimethoxydiphenyl, 4-methyl-4'-methoxydiphenyl ether and other alkoxy substituted diphenyl ethers; and dibenzofuran, Xanthene and other cyclic diphenyl ethers. Preferred solvents are anisole and diphenyl ether. These solvents can be used singly or as a mixture.

In the case of using an organic solvent in the reaction, the concentration of the polymer in the solvent differs depending upon the desired molecular weight of polyhydroxycarboxylic acid, reaction temperature and kind of the organic solvent used. The concentration is preferably 10~95% by weight, more preferably 25~70% by weight, most preferably 40~60% by weight. A content less than 10% by weight is unfavorable in view of economy and reaction velocity. When the concentration exceeds 95% by weight, the effect of the organic solvent cannot be found.

The vertical high viscosity reactor has various ribbon type stirring blades in the interior of a vertical main body. Surface renewal is conducted by rotation of the axis according to such mode of flow that the material components flow up along the wall surface of the reactor and flow down in the central portion. Thus, evaporation of low boiling components is accelerated and polycondensation reaction is promoted.

Figure 2:
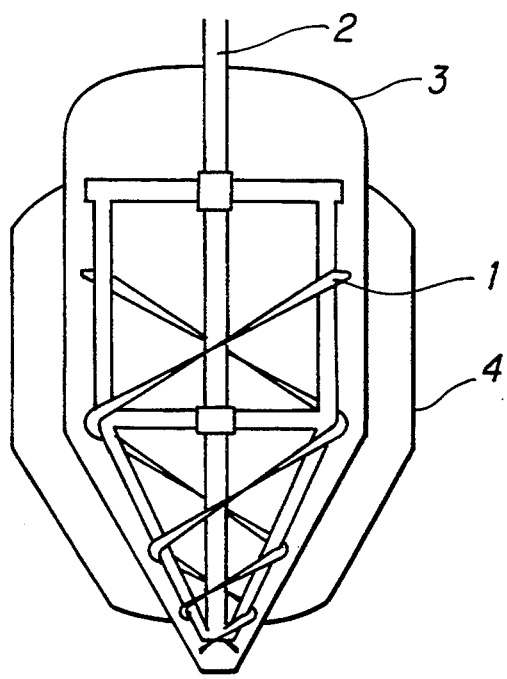
FIG. 2 is a schematic drawing of a vertical high viscosity cone reactor of the invention which is equipped with a ribbon type stirring blade supported with a shaft.
Figure 3:
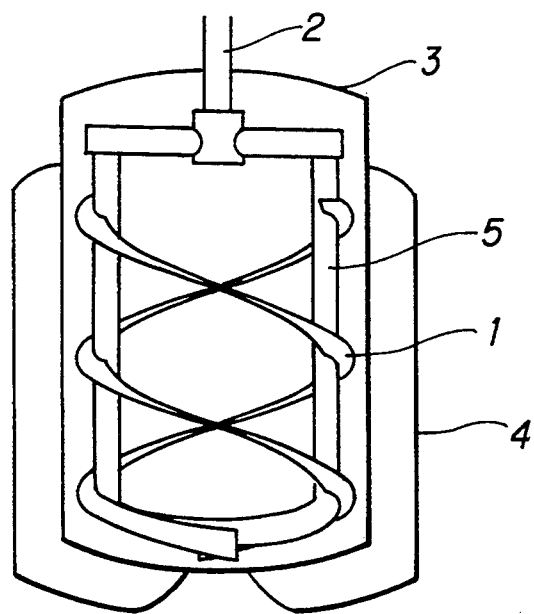
FIG. 3 is a schematic drawing of a vertical high viscosity reactor of the invention which is equipped with a ribbon type stirring blade supported with a frame.

Exemplary types of the stirring blades which can be employed in the invention are illustrated from FIG. 1 to FIG. 4. These blades include, for example, double helical ribbon blades supported with a rotation axis which are illustrated in FIG. 1 and FIG. 2, double-helical ribbon blades of FIG. 3 which are supported with a frame in order to eliminate material retention and to enhance mixing ability, and cone shaped double-helical ribbon blades of FIG. 4 which are supported with a frame in order to eliminate material retention and to enhance mixing ability and product discharge function.

The reaction can be carried out under atmospheric pressure or reduced pressure. When the reaction is conducted under reduced pressure, the reactor is connected with a vacuum pump. The reaction mixture is stirred in the ventilation of an inert gas or under reduced pressure. Exemplary inert gases include nitrogen and argon.

The reaction is carried out by heating the interior of the high viscosity reactor with a heating medium or electric heating. Reaction temperature differs depending upon the presence or absence of the organic solvent and the boiling point of the organic solvent when the solvent is used. The reaction temperature also differs depending upon the thermal stability of the formed polymer and is preferably in the range of 50°~250° C., more preferably in the range of 100°~200° C. A reaction temperature lower than 50° C. leads to a slow rate of reaction and is unfavorable in economy. When the reaction temperature exceeds 250° C., the polymer formed is liable to deteriorate.

In order to inhibit color development due to heat deterioration in the polycondensation reaction, the polycondensation reaction in the process of the invention can be carried out in the presence of a coloring inhibitor. The coloring inhibitors which can be used are preferably phosphorus compounds such as phosphoric acid, triphenyl phosphate, pyrophosphoric acid, phosphorous acid and triphenyl phosphite. The coloring inhibitors are added in an amount of usually 0.01~5% by weight, preferably 0.5~2% by weight of the polymer. An amount less than 0.01% by weight leads to poor effect on inhibition of coloring. Even though the amount exceeds 5% by weight, the effect on coloring inhibition is difficult to enhance and molecular weight increase in the formed polymer is liable to be restricted.

EXAMPLES

The present invention will hereinafter be illustrated by way of examples. However, these examples and equipments are not to be construed to limit the scope of the invention.

The average molecular weight of polymers illustrated in these examples was measured by gel permeation chromatography at the column temperature of 40° C. by comparing with a polystyrene reference sample.

Synthetic Example 1

To a 3 l vessel type reactor equipped with conventional anchor type stirring blades and a reflux condenser, 0.6 kg of 90% L-lactic acid was charged and heated at 130° C. for 3 hours with stirring under reduced pressure of 50 mmHg while removing water by distillation out of the reaction system. Thereafter, 1.5 kg of diphenyl ether (DPE) and 0.5 g of tin powder were added into the reactor. Further, a column was packed with 100 g of molecular sieve 3A and mounted on the reactor so as to return the distilled solvent to the reaction system after passing through the molecular sieve column. The reaction conditions were set at 130° C./15 mmHg and stirring was continued for 5 hours. Low molecular weight polylactic acid thus obtained had an weight average molecular weight (Mw) of about 10,000.

Example 1

A 1 l vertical high viscosity reactor equipped with double helical ribbon blades as illustrated in FIG. 1 was used and had satisfactory surface renewal function.

After heating the low molecular weight polylactic acid solution obtained in Synthetic Example 1 to 100° C., 700 g of the solution was fed to the reactor with a feed pump. The pressure in the reactor was gradually reduced to 20~15 mmHg while 30 g of diphenyl ether was distilled off at 130° C. Thus, the polylactic acid solution was concentrated to about 50% by weight. Successively, a column was packed with 100 g of molecular sieve 3A and the column was mounted on the reactor so as to return the distilled solvent to the reaction system after passing through the molecular sieve column. The reaction was continued at 130° C. under a reduced pressure of 15 mmHg.

Sampling was carried out every 10 hours in the course of the reaction and a weight average molecular weight was measured. Results are illustrated in Table 1.

TABLE 1

| Reaction time after reaching 130° C., 15 mmHg | Weight average molecular weight |
| --- | --- |
| 10 (hrs) | 85,000 |
| 20 | 160,000 |
| 30 | 190,000 |
| 40 | 210,000 |

Comparative Example 1

To a 1 l vessel type reactor which had the same structure as the reactor used in Synthesis Example 1, 400 g of low molecular weight polylactic acid obtained in Synthesis Example 1 was charged. The reaction was continued at 130° C. under reduced pressure of 15 mmHg. Sampling was carried out every 10 hours in the course of the reaction and a weight average molecular weight was measured. Results are illustrated in Table 2.

TABLE 2

| Reaction time after reaching 130° C., 15 mmHg | Weight average molecular weight |
| --- | --- |
| 10 (hrs) | 68,000 |
| 20 | 84,000 |
| 30 | 104,000 |
| 40 | 115,000 |
| 50 | 127,000 |

Synthetic Example 2

Figure 5:
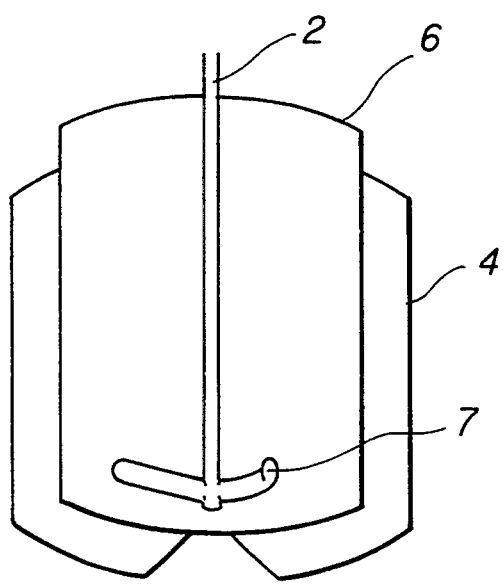
FIG. 5 is a schematic drawing of a vessel type reactor which is equipped with three sweep back blades supported with a shaft used in the synthetic example and comparative example of the invention.

To a 500 l glass lined vessel type reactor equipped with a conventional stirring blade illustrated in FIG. 5, jacket, thermometer and distiling tube, 112.5 kg (1125 mol) of 90% L-lactic acid having water content of 10% by weight, 0.405 kg (3.4 mol) of tin powder and 236 kg of diphenyl ether were charged.

The jacket was heated to 140° C. and water was distilled off at 130° C. for 5 hrs with stirring under reduced pressure of 160~130 mmHg. The reactor jacket temperature was raised to 150° C. and azeotropic dehydration was carried out at 140° C. under reduced pressure of 110~100 mmHg. During the reaction, the operation for removing distilled water and returning diphenyl ether alone to the reactor was continued for 15 hours.

Low molecular weight polylactic acid thus obtained had a weight average molecular weight (Mw) of about 30,000 and a concentration of 25% by weight.

Example 2

A 20 l reactor illustrated in FIG. 1 was used. After heating the low molecular weight polylactic acid solution obtained in Synthetic Example 2 to 100° C., 15 kg of the solution was fed to the reactor with a feed pump. The pressure in the reactor was gradually reduced to 20~15 mmHg while distilling out 7.5 kg of diphenyl ether during 2 hours at 130° C. Thus, the polylactic acid solution was concentrated to 50% by weight. In the next step, pipe lines were switched so as to cool the distillate (diphenyl ether) from the reactor with a condenser, recover diphenyl ether into a solvent storage tank, dry diphenyl ether by passing through a column packed with 40 kg of molecular sieve 4A, and return dried diphenyl ether to the reactor. Polycondensation reaction was carried out in such pipe line connection at 150° C. under reduced pressure of 20~15 mmHg. Sampling was carried out every 10 hours in the course of the reaction and a weight average molecular weight was measured. Results are illustrated in Table 3.

Example 3

Figure 4:
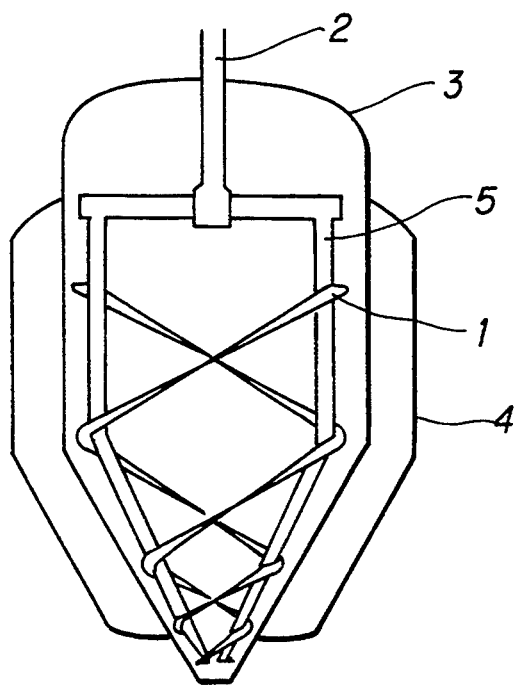
FIG. 4 is a schematic drawing of a vertical high viscosity cone reactor of the invention which is equipped with a ribbon type stirring blade supported with a frame.

A 90 l reactor illustrated in FIG. 4 was used. After heating the low molecular weight polylactic acid solution obtained in Synthetic Example 2 to 100° C., 65 kg of the solution was fed to the reactor with a feed pump. The pressure in the reactor was gradually reduced to 20~15 mmHg while distilling out 32.5 kg of diphenyl ether during 2 hours at 130° C. Thus, the polylactic acid solution was concentrated to 50% by weight. In the next step, pipe lines were switched so as to cool the distillate (diphenyl ether) from the reactor with a condenser, recover, diphenyl ether into a solvent storage tank, dry diphenyl ether by passing through a column packed with 40 g of molecular sieve 4A, and return dried diphenyl ether to the reactor. Polycondensation reaction was carried out in such line connection at 150° C. under reduced pressure of 20~15 mm Hg. Sampling was carried out every 10 hours in the course of the reaction and a weight average molecular weight was measured. Results are illustrated in Table 3.

Example 4

A 90 l reactor illustrated in FIG. 4 was used. After heating the low molecular weight polylactic acid solution obtained in Synthetic Example 2 to 100° C., 65 kg of the solution was fed to the reactor with a feed pump. The pressure in the reactor was gradually reduced to 20~15 mmHg while distilling out 20.0 kg of diphenyl ether during 2 hours at 130° C. Thus, the polylactic acid solution was concentrated to 87% by weight. In the next step, pipe lines were switched so as to cool the distillate (diphenyl ether) from the reactor with a condenser, recover, diphenyl ether into a solvent storage tank, dry diphenyl ether by passing through a column packed with 40 g of molecular sieve 4A, and return dried diphenyl ether to the reactor. Polycondensation reaction was carried out in such line connection at 150° C. under reduced pressure of 20~15 mmHg. Sampling was carried out every 10 hours in the course of the reaction and a weight average molecular weight was measured. Results are illustrated in Table 3.

Example 5

A 90 l reactor illustrated in FIG. 4 was used. After heating the low molecular weight polylactic acid solution obtained in Synthetic Example 2 to 100° C., 78 kg of the solution was fed to the reactor with a feed pump. The pressure in the reactor was gradually reduced to 20~15 mmHg while distilling out 48.0 kg of diphenyl ether during 2 hours at 130° C. Thus, the polylactic acid solution was concentrated to 60% by weight. In the next step, pipe lines were switched so as to cool the distillate (diphenyl ether) from the reactor with a condenser, recover, diphenyl ether into a solvent storage tank, dry diphenyl ether by passing through a column packed with 40 g of molecular sieve 4A, and return dried diphenyl ether to the reactor. Polycondensation reaction was carried out in such line connection at 150° C. under reduced pressure of 20~15 mmHg. Sampling was carried out every 10 hours in the course of the reaction and a weight average molecular weight was measured. Results are illustrated in Table 3.

Comparative Example 2

A portion of low molecular weight polylactic acid obtained in Synthetic Example 2 was subjected to polycondensation reaction in a vessel type reactor used in Synthetic Example 2. The reaction was continued at 130° C. under reduced pressure of 15 mmHg. Sampling was carried out every 10 hours in the course of the reaction and a weight average molecular weight was measured. Results are illustrated in Table 3.

TABLE 3

| Poly-condensation time (hr) | Weight average molecular weight | | | | |
|---|---|---|---|---|---|
| | Example 2 | Example 3 | Example 4 | Example 5 | Comparative Example 2 |
| 0 | 31,000 | 31,000 | 31,000 | 31,000 | 31,000 |
| 10 | 73,000 | 85,000 | 87,000 | 95,000 | 69,000 |
| 20 | 105,000 | 130,000 | 128,000 | 122,000 | 97,000 |
| 30 | 150,000 | 180,000 | 175,000 | 169,000 | 110,000 |
| 40 | 173,000 | 214,000 | 203,000 | 210,000 | 131,000 |
| 50 | — | — | — | — | 137,000 |

What is claimed is:

1. A process for preparing polyhydroxycarboxylic acid comprising conducting condensation polymerization of hydroxycarboxylic acid under conditions selected to form the polyhydroxycarboxylic acid from the hydroxycarboxylic acid wherein the improvement comprises conducting condensation polymerization in a vertical reactor having side walls and provided with a ribbon stirring blade having a rotational axis, said ribbon stirring blade imparting a flow pattern to the contents of the vertical reactor so that vertical flow is obtained along the side walls in a direction opposite to vertical flow along the rotational axis of the ribbon stirring blade.

2. The process of claim 1 wherein the ribbon stirring blade is supported with a frame.

3. The process of claim 1 wherein the vertical reactor has a bottom portion that is inwardly tapered and the ribbon stirring blade has a bottom portion conforming to the tapered portion of the vertical reactor.

4. The process of claim 3 wherein the ribbon stirring blade is supported with a frame.

5. The process of claim 1 wherein the hydroxycarboxylic acid is selected from the group consisting of lactic acid, glycolic acid, 3-hydroxybutyric acid, 4-hydroxybutyric acid, 3-hydroxyvaleric acid and mixtures thereof.

6. The process of claim 1 wherein the condensation polymerization is conducted in the presence of a catalyst selected from the group consisting of a metal of Groups I, II, III, IV, and V, salts thereof, hydroxides thereof and oxides thereof.

7. The process of claim 6 wherein the catalyst is selected from the group consisting of tin, tin oxide, stannous chloride, stannic chloride, stannous bromide, stannic bromide, tin sulfate, tin acetate, tin octoate, tin lactate and tin p-toluenesulfonate.

8. The process of claim 1 wherein the condensation polymerization is conducted in an organic solvent selected from the group consisting of aromatic hydrocarbons and aromatic ethers.

9. The process of claim 8 wherein the organic solvent is a diphenyl ether.

10. The process of claim 8 wherein the concentration of hydroxycarboxylic acid in the organic solvent is from 10 to 95% by weight.

11. The process of claim 10 wherein the concentration of hydroxycarboxylic acid in the organic solvent is from 25 to 70% by weight.

12. The process of claim 10 wherein the concentration of hydroxycarboxylic acid in the organic solvent is from 40 to 60% by weight.

13. The process of claim 1 wherein the polycondensation reaction is conducted in the range of from 50° C. to 250° C.

14. The process of claim 13 wherein the polycondensation reaction is conducted in the range of from 100° C. to 200° C.

15. The process of claim 1 wherein the entire polycondensation reaction is conducted in the vertical reactor.

16. The process of claim 1 wherein the polycondensation reaction is conducted in the presence of a phosphorus compound coloring inhibitor.

17. The process of claim 16 wherein the phosphorus compound coloring inhibitor is selected from the group consisting of phosphoric acid, triphenyl phosphate, pyrophosphoric acid, phosphorus acid, and triphenyl phosphite.

18. The process of claim 17 wherein the phosphorus compound coloring inhibitor is present in an amount of 0.01 to 5% by weight of polyhydroxycarboxylic acid.

* * * * *